United States Patent [19]
Sereno et al.

[11] Patent Number: 5,490,136
[45] Date of Patent: Feb. 6, 1996

[54] METHOD OF CONTROLLING TRANSMISSION ON A SAME RADIO CHANNEL OF VARIABLE-RATE INFORMATION STREAMS IN RADIO COMMUNICATION SYSTEMS

[75] Inventors: Daniele Sereno, Turin, Italy; Karl Hellwig, Nürnberg, Germany; Ermanno Berruto, Turin, Italy

[73] Assignees: CSELT - Centro Studi e Laboratori Telecomunicazioni SpA, Turin, Italy; U.S. Philips Corporation, New York, N.Y.

[21] Appl. No.: 241,207

[22] Filed: May 10, 1994

[30] Foreign Application Priority Data

May 14, 1993 [IT] Italy .................................. TO93A0335

[51] Int. Cl.[6] .................................................. H04J 13/00
[52] U.S. Cl. .............................. 370/18; 370/84; 370/95.1; 379/58; 379/59; 379/63; 455/33.1
[58] Field of Search ..................................... 370/18, 84, 79, 370/95.1, 110.1; 379/58–60, 63; 455/33.1, 33.2

[56] References Cited

U.S. PATENT DOCUMENTS

| | | | |
|---|---|---|---|
| 3,534,264 | 10/1970 | Blasbalg et al. | 325/15 |
| 4,357,700 | 11/1982 | Alvarez, III et al. | 370/84 X |
| 4,550,399 | 10/1985 | Caron | 370/84 X |
| 5,103,459 | 4/1992 | Gilhousen et al. | 370/18 X |
| 5,115,429 | 5/1992 | Hluchyj et al. | 370/84 |
| 5,335,356 | 8/1994 | Andersson | 379/59 X |

Primary Examiner—Douglas W. Olms
Assistant Examiner—Russell Blum
Attorney, Agent, or Firm—Herbert Dubno

[57] ABSTRACT

In a radio communication system, in particular a mobile communication system, variable-rate information flows originating from different sources (CV1, CS1; CV2, CS2) and relative to a same communication are transmitted on a same radio channel. Each mobile station (M1 ... Mh) and the fixed part (B1 ... Bn; RNC) of the system comprise a unit for the control of the variable-rate transmission, which dynamically allocates the available bits to the different streams by taking into account the needs of the sources (CV1, CS1; CV2, CS2), the conditions of the channel (6) and the system occupancy. (FIG. 1).

25 Claims, 3 Drawing Sheets

METHOD OF CONTROLLING TRANSMISSION ON A SAME RADIO CHANNEL OF VARIABLE-RATE INFORMATION STREAMS IN RADIO COMMUNICATION SYSTEMS

SPECIFICATION

1. Field of the Invention

The present invention relates to radio communication systems and, more particularly, to a method of controlling transmission on a given channel of variable-rate information streams in these systems, and a system using this method.

Preferably, but not exclusively, the communication system is a mobile communication system, and the information streams are represented by coded speech signals and control signals of a speech communication on the user channel of such a system.

2. Background of the Invention

In the framework of research concerning future development of mobile communications, it is desirable to define general characteristics of systems presenting a high degree of flexibility, so as to allow the introduction of services which today are even completely unknown or cannot be foreseen.

One example is that known as the Universal Mobile Telecommunications System'.

A performance which is considered as suitable is that these systems should be able to process variable-rate information streams. In fact, considering the preferred application, the two information streams (speech and control signals, meaning by the latter term both the conventional telephone signalling and the other signals, e.g. measurement results, handover commands, etc., typical of a mobile communication system) are variable-rate streams. The variability of the speech stream is due to the nature of speech itself, the characteristics of which change during time, due to the existence of pauses during a conversation, due to the characteristics of the speaker, etc.

Also control signals comprise information of different nature, some of which must be transmitted periodically (e.g. results of measurements) while others (e.g. handover commands) are to be transmitted whenever necessary. Moreover, redundancy should be introduced to protect information and may vary for both streams depending on the conditions of the radio channel.

Based on the criteria, access techniques to radio channels have been examined which are well suited to variable information stream processing, specifically techniques of the type known as Code Division Multiple Access (CDMA). When these techniques are used, system capacity is linked to the average interference generated by active users. Therefore each reduction of data transmitted at a given moment allows increasing the overall number of conversely, a reduction of traffic allows satisfying the requests for greater resources by certain communications.

In the case of a speech communication between a mobile station and a base station, it is possible to multiplex the two information streams, after the respective channel coding, on the same radio channel, since this solution is doubtless more efficient than the allocation of a separate channel to each stream. Considering that for each physical channel there is a maximum transmission rate, which can vary depending on the system conditions, the problem arises of sharing conveniently the available bits between the two streams.

A spread spectrum communication system is already known, where two information streams at variable rates originated by two different sources (in particular speech communication traffic and communication control signals) are combined on the same physical channel. This system is described in 'Proposed EIA/TIA Wideband Spread Spectrum Standard', Qualcomm Inc., 15 May 1992, pages 6–32 to 6–42 and 7–27 to 7–83.

The known system admits of four transmission rates between mobile stations and base stations, in particular 1200, 2400, 4800 and 9600 bits/s. The system can operate at any one of the four rates when only speech signals are to be transmitted. When control signals, are also to be transmitted, the system always operates at the maximum rate, taking into account, first of all, the requirements of control signals. If these do not require all of the available rate, speech signals can be transmitted too. This management system is hardly flexible and under certain conditions it can lead to a deterioration of the speech signal quality. This deterioration could be avoided with a more sophisticated allocation criterion.

OBJECT OF THE INVENTION

The aim of the invention is to provide a method of controlling transmission, and a system using the method, where the choice of the transmission rate is effected on the basis of a joint assessment of the needs of the individual information streams so as to keep the quality of service constant.

SUMMARY OF THE INVENTION

According to the invention, a method is therefore provided of controlling transmission on a given radio channel (in particular, a radio channel of a mobile communication system) of variable-rate information streams related to the same communication and originated by different sources, in which each stream is emitted by a source at a rate which is selected, in a given time interval, within a respective set of source rates and the stream is associated, before being sent on the channel, with a redundancy which is selected within a set of possible redundancy schemes and determines an increase of the stream rate. According to the invention, in this interval, there are assessed the source needs in terms of the emission rate which is best suited to the stream characteristics, the channel needs in terms of the redundancy to be associated with the individual streams, and the system needs in terms of the channel rate, and each stream is allocated an emission rate and a redundancy which guarantee the attainment of a predetermined quality of the particular communication and of the service offered by the system.

The communication system utilizing the method comprises at least two stations connected via radio channels and comprising:

sources of variable-rate information streams related to a common communication, which streams must be combined on the same radio channel, each source being able to operate, in a given time interval, at a rate chosen within a respective set of rates;

means for introduce into each stream, in the said time interval, a redundancy chosen within a set of possible redundancy schemes, each of which causes an increase in the rate of the stream emitted by the source;

means for combining the individual streams into a single stream to be transmitted on the channel and;

management units for and the stations.

Stations are associated with a control unit of the variable-rate streams, which unit, for each communication, receives from the sources information related to the respective needs in terms of the emission rate which is best suited to the characteristics of the respective information stream in that interval, and receives from the management units information about the needs of the channel and of the whole system during that interval, expressed in terms of redundancy to be introduced and respectively of transmission rate on the channel, and supplies the sources and the means for introducing redundancy with commands for the choice of a particular source rate and of a particular redundancy, the rates and the redundancies chosen being those which guarantee the attainment of a predetermined quality of the particular communication and of the service offered by the system.

According to a preferred embodiment of the invention, the rates and the redundancies chosen are those which meet the respective needs if the total rate resulting from the combination of the streams on the channel, expressed as the sum of the stream emission rates and the rate increments due to the redundancies, does not exceed a rate imposed by the system conditions, and otherwise each stream is allocated such an emission rate and such a redundancy as to minimize a cost of the communication, linked to the quality of the particular communication and of the service offered by the system, and given by the sum of the costs resulting from the individual needs.

Preferably, the two stations are a mobile station and a fixed part (base station and radio network control) of a mobile communication system.

BRIEF DESCRIPTION OF THE DRAWING

The above and other objects, features, and advantages will become more readily apparent from the following description, reference being made to the accompanying drawing in which:

In FIG. 1 the mobile communication system in which the invention is applied is schematized by a set of mobile stations M1 ... Mh, by a set of base stations B1 ... Bn, connected to the mobile stations by means of radio channels to which the stations have access according to code division techniques, and by a radio network control center RNC.

Figure 1:
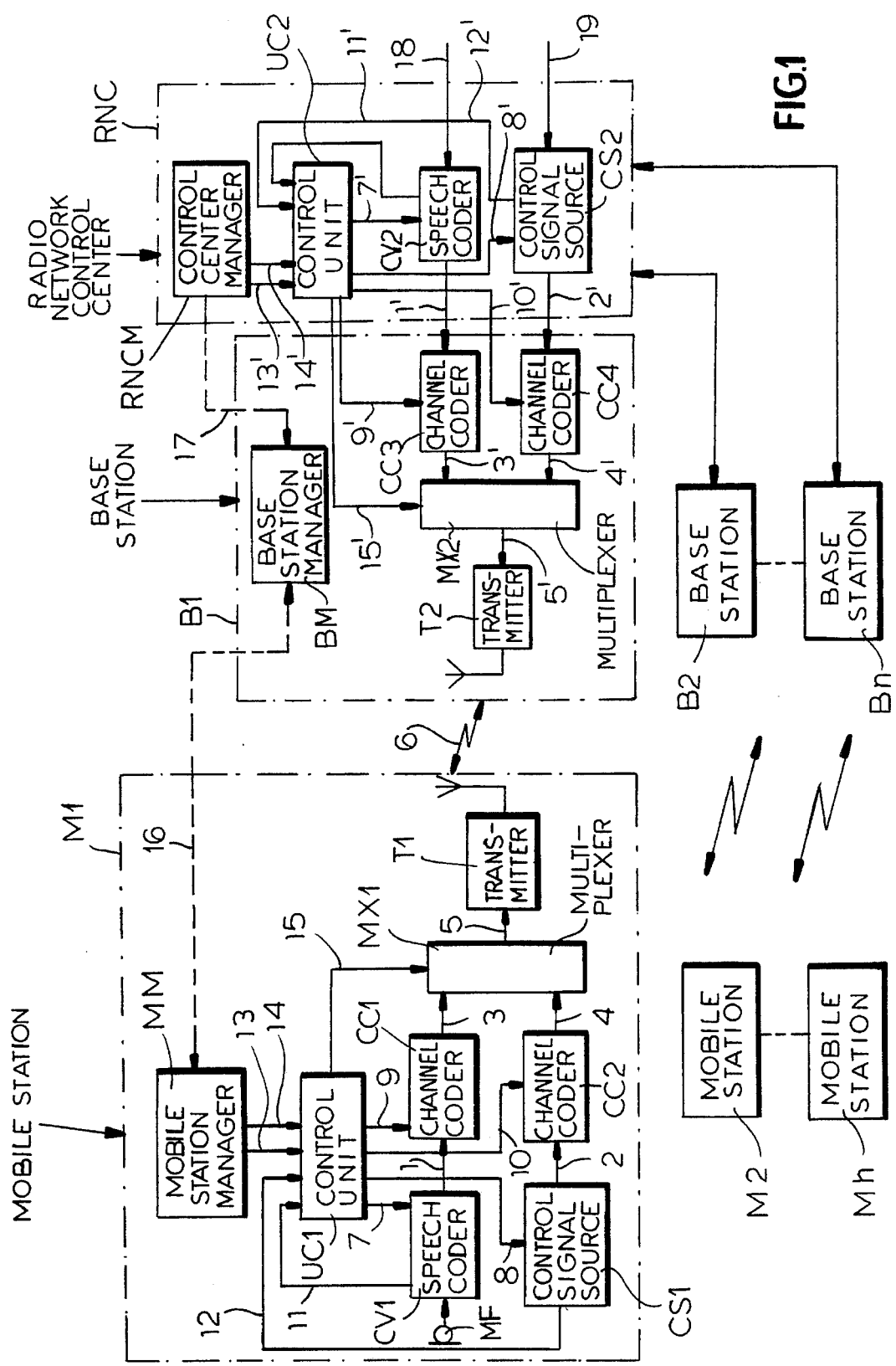
FIG. 1 is a block diagram of a mobile communication system utilizing the invention.

As indicated for M1, for variable-rate speech and control signal transmission a mobile station ideally comprises:

a speech coder CV1 which receives speech signals from microphone MF and emits on a connection 1 a coded signal at a rate r 1 generally variable frame by frame; for example speech coder CV1 can be based on analysis-by-synthesis techniques; for the purpose of the invention, speech coder CV1 constitutes the source of the respective information stream;

a source CS1 of control signals issuing on a connection 2 a stream at a rate $r_2$ which is also generally variable frame by frame; in general the whole stream of control signals (hereinafter referred to also as "signalling") to be transmitted by the mobile stations to the base station will be generated locally and block CS1 schematically represents all of the units producing this signalling;

channel coders CC1, CC2 for speech signals and control signals, respectively, which coders receive the signals generated by speech coder CV1, control signal source CS1 and associate them with a redundancy, which in general is also variable frame by frame and results in a rate increase $r_3$, $r_4$; coders CC1, CC2 can be of any of the types used in mobile communication systems; e.g. channel coding can be based on convolutional coding.

Information streams present on outputs 3, 4 of the channel coders are combined by a multiplexer MX1 into a single stream sent through connection 5 to the CDMA transmitter T1, which forwards it on radio channel 6 multiplexer. MX1 and transmitter T1 incorporate all the units needed to organize the transmission according to the protocols required by the particular communication system.

Rates and redundancies $r_1$, $r_2$, $r_3$, $r_4$ to be adopted at a given time o interval (e.g. a frame in a code division transmission) are communicated to blocks CV1, CS1, CC1, CC2 through connections 7–10 by a unit UC1 controlling the variable-rate transmission. Control unit UC1, which constitutes the subject matter of the invention, communicates to multiplexer MX1 also the information about total rate $r_{tot}=r_1+r_2+r_3+r_4$ through connection 15. The rates are determined by control unit UC1 taking into account the needs of speech, signalling, channel and system.

The needs of speech and signalling can be represented by information related to the rate best suited for coding the particular speech segment or for signalling transmission in that stage. Channel conditions, which can vary both in time and depending on the position of the mobile, can be e.g. represented by information on the measured error rate, determining the protection needs of the signals and therefore the redundancy which channel coders CC1, CC2 must introduce. Finally, the system conditions, which determine the rate actually available on channel 6, depend on traffic conditions. For example e.g. low traffic conditions can allow a higher transmission rate for speech and therefore a better quality of the same, which can be obtained e.g. by a wide-band coding, while heavy traffic conditions can set limits to maximum data rate. units to control unit UC1 through connections 11, 12; the information related to the conditions of radio channel 6 and of the system are supplied through connections 13, 14 by a mobile station management unit MM. In general the information on the channel and on the system is not, or is not all, available to MM which, for this purpose, must dialogue with the base station management unit BM, as outlined by logical connection 16.

Considering that the output quantities from control unit UC1, i.e. the rates, are discrete quantities, it has been deemed convenient that also the input quantities should be discrete quantities, which can be represented by indices I1 ... I5. In particular:

I1 ($1<I1<N1$) identifies which of N1 possible operating rates of the coder CV1 is best suited for speech coding in that frame; in an exemplary embodiment, seven rate values were provided for speech coder CV1, ranging from 400 bit/s to 16 kbit/s;

I2 ($1<I2<N2$) identifies one of N2 possible transmission rates for control signals; in the example, four possible rate values were foreseen, e.g. 0, 2, 4, 8 kbit/s;

I3, I4 ($1<I3<N3$ and $1<I4<N4$) identify one of the possible protection schemes and therefore one of the possible redundancies to be used for speech and signalling, respectively; in general, for both types of signals, the choice will be between a strong protection and a mild protection even if the same scheme uses different redundancies for the two types of signals; a single index can therefore be used to indicate the channel needs; the example considered adopted this solution with redundancies ranging from 0.6 to 11 kbits/s or from 0.6 to 15 kbits/s for speech (respectively in the case of mild or strong protection) and from 0 to 10 kbit/s or from 0 to 22 kbit/s for signalling;

I5 (1<I5<N5) identifies one of N5 occupancy levels of the system (with level 1 corresponding to minimum occupation) and therefore one of N5 possible rates on channel 6; in the example considered, the channel rates varied between 1 kbit/s and 40 kbit/s, in steps of 1 kbit.

On the basis of this information, control unit UC1 determines rates $r_1 \ldots r_4$ so as to satisfy entirely the rate and protection requirements of the different streams, if this is allowed by the system conditions; otherwise the rates are determined so as to minimize the total cost which must be paid to obtain a predetermined quality. Total cost will be represented by the sum of the costs linked with the individual needs. These costs in the described embodiment are digital values which give, for instance, an indication of the distortion associated with a certain rate of the coded signal (for speech) or with certain conditions of the channel or the system, or of the time required for the execution of a procedure (for control signals). These values can be determined a priori, e.g. by means of a simulation, and improved by field measurements during a stage of experimental running of system. Costs connected with the different needs must be normalized with respect to a common base. To simplify the realization, costs can be considered constant, and the described example refers to this case.

A possible example of a cost minimization algorithm will be described with reference to FIG. 3.

A set of units similar to the one described is present also in the fixed part of the system, for managing communication towards the mobile. Units CV2, CS2, CC3, CC4, MX2, T2, UC2 correspond to the units CV1, CS1, CC1, CC2, MX1, T1, UC1 of the mobile; RNCM, BM are the management units of the radio network control unit and of the base station. Reference numerals 1' . . . 15' indicate connections corresponding to the connections 1 . . . 15 of the mobile.

As it can be seen, the devices concerned with the management of the communication towards the mobile are shared between the base station and the network control unit RNC. In particular, the devices more directly involved in the transmission aspects (channel coders, multiplexer, transmitter) are located in the base station; the speech coder, the control signal source and the control unit of the variable-rate transmission are located in the network control unit. The information about the channel and system conditions are supplied to control unit UC2 by the network control management unit RNCM which dialogues with management unit BM of the base station in order both to obtain information about the channel and/or system conditions available only in BM, and to supply BM with the information about channel and/or system conditions to be sent to MM. The logical connection between BM and RNCM is indicated by 17. Moreover in this case the control signals are partly generated locally and partly will arrive from the land network (not represented), from which the speech to be coded arrives at speech coder CV2. Connections with the land telecommunications network are indicated by 18, 19 for speech and control signals, respectively.

It should however be noted that the system organization shown in FIG. 1 is a logical organization which is used to explain the location of the invention in the system and the operations performed by the invention, and it has no binding character on the real location of the units performing the functions described. In particular, logical connection 16 between BM and MM will be physically realized by means of an exchange of signalling through channel 6.

The receiving part, both in the mobile station and in the fixed part is not concerned by the invention and therefore it is not represented.

Figure 2:
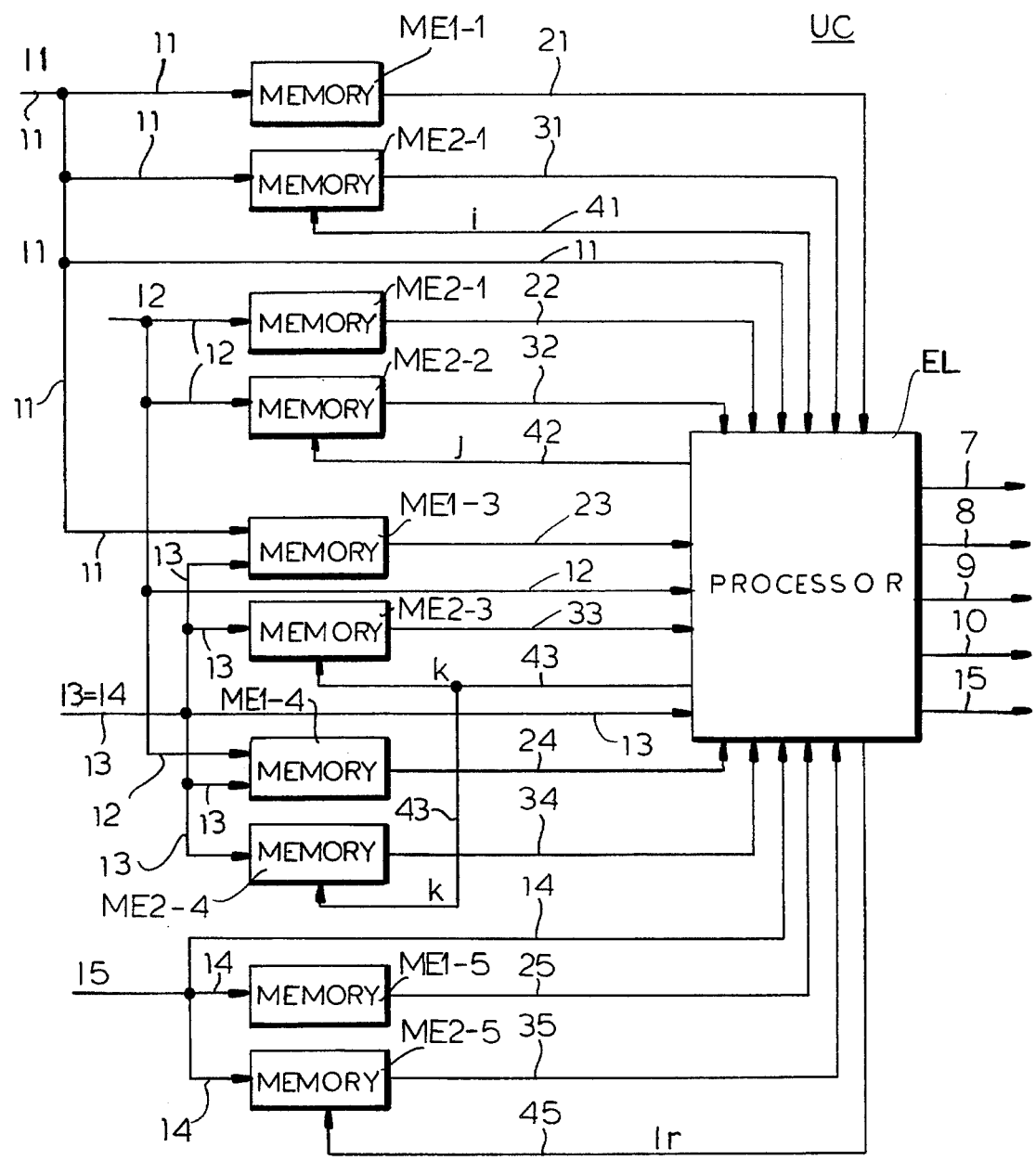
FIG. 2 is a block diagram of the control unit according to the invention.

FIG. 2 shows the structure of a control unit UC, e.g. UC1. The unit comprises two groups of memories ME1-1, ME2-1, ME1-2, ME2-2 . . . ME1-5, ME2-5 associated with each of the inputs, and a processing unit EL which executes the cost minimizing algorithm using the data read in the memories.

Memories ME1 store a parameter relevant to the stream rate at the output from the source, the channel coder and the multiplexer; the parameter is a vector (for the inputs associated with indices I1, I2, I5) or a matrix (for I3, I4). Memories ME2 store a matrix of costs. Considering that the emission rates and the redundancy schemes are fixed for a given configuration of the communication system and supposing that costs are constant, memories ME1, ME2 are read only memories.

Rate vectors $\overline{R1}=[r_1(1), r_1(2) \ldots r_1(N1)]$, $\overline{R2}=[r_2(1) \ldots r_2(N2)]$ and $\overline{R5}=[r_5(1) \ldots r_5(N5)]$ are vectors with N1, N2 or respectively N5 components, corresponding each to one of the possible operation rates of CV1 and CS1 or one of the N5 transmission rates on channel 6. The components are ordered according to increasing values from the first to the N1-th or N2-th for $\overline{R1}$, $\overline{R2}$, and in a decreasing order from $r_5(1)$ to $r_5(N5)$ for $\overline{R5}$. The memories are addressed at each frame by I1, I2, I5 and supply EL, through connections 21, 22, 25, with the vector component read in each of them.

Cost matrices $$\overline{\overline{C1}} = \begin{matrix} c_1(1,1), c_1(1,2) \ldots c_1(1,N1) \\ \ldots \\ c_1(N1,1) \ldots c_1(N1,N1) \end{matrix} \qquad \overline{\overline{C2}} = \begin{matrix} c_2(1,1), c_2(1,2) \ldots c_2(1,N2) \\ \ldots \\ c_2(N1,1) \ldots c_2(N2,N2) \end{matrix}$$

stored in ME-1, ME-2 are addressed by rows by index I1 or respectively I2 and by columns by an index i, or respectively j, generated during the communication cost minimizing algorithm. Indices i, j can take values varying from I1 (I2) to 1, including the extreme values. Indices i, j are supplied by EL through connections 41, 42. The datum read is supplied to EL through connections 31, 32. In each row the costs decrease as the column index increases.

Costs $c_1$ can for example express a measure of the perceptual distortion associated with a particular combination requested rate-allocable rate. Costs $c_2$ can be the expression of the quality of service represented e.g. as the time for the execution of a procedure and therefore as the probability that the procedure itself could be completed in a preset time. In practice, since i, j can never exceed I1, I2, the matrices are triangular matrices, where only the values below the diagonal differ from 0; the costs on the diagonal can be allotted the value 0, where 'cost 0' means that the system is able to supply exactly the requested rate. The same convention will be adopted for the other cost matrices.

Cost matrix $$\overline{\overline{C5}} = \begin{matrix} c_5(1,1) \ldots c_5(1,N5) \\ \ldots \\ c_5(N5,1) \ldots c_5(N5,N5) \end{matrix}$$

stored in ME2-5 is addressed by index I5 for the rows and by an index Ir, associated with the total rate $r_{tot}$ and generated during the cost minimization algorithm, for the columns. Index Ir is present on a connection 45.

It is to be noted that, when $r_{tot}$ lies between two consecutive values of $r_5$, index Ir is associated with the higher value: i.e., considering that the rates in $\overline{R5}$ are decreasing, $R5(Ir+1) < r_{tot} \leq R5(Ir)$. Costs $c_5$ decrease along the rows.

In matrix $\overline{\overline{C5}}$ costs $c_5(p,q)$ with p>q correspond to system rates greater than total rate and therefore can be considered as negative costs; the opposite for p<q. The datum read in $\overline{\overline{C5}}$ is supplied to E1 through connection 35.

The third and fourth inputs are associated with memories ME1-3, ME1-4 and ME2-3, ME2-4 storing respective rate matrices $\overline{R3}$, $\overline{R4}$ and cost matrices $\overline{\overline{C3}}$, $\overline{\overline{C4}}$. The two rate matrices $$\overline{\overline{R3}} = \begin{matrix} r_3(1,1) \ldots r_3(1,N3) \\ \ldots \\ r_3(N1,1) \ldots r_3(N1,N3) \end{matrix} \quad \overline{\overline{R4}} = \begin{matrix} r_4(1,1) \ldots r_4(1,N4) \\ \ldots \\ r_4(N2,1) \ldots r_4(N2,N4) \end{matrix}$$

contain N1 or respectively N2 rows corresponding to the N1 or N2 source rates, and N3 or respectively N4 columns (with N3=N4 in the example considered) whose number is equal to the number of provided channel coding schemes. Rate values in the rows of the two matrices increase as the column index increases. Reading pointers in the two matrices are respectively I1, I2 for the rows and I3 for the columns. The datum read is presented on connections 23, 24. The two matrices are constant.

Cost matrices $$C3 = \begin{matrix} c_3(1,1) \ldots c_3(1,N3) \\ \ldots \\ c_3(N3,1) \ldots c_3(N3,N3) \end{matrix} \quad C4 = \begin{matrix} c_4(1,1) \ldots c_4(1,N4) \\ \ldots \\ c_4(N4,1) \ldots c_4(N4,N4) \end{matrix}$$

stored in ME2-3, ME2-4 are totally similar to matrices , $\overline{\overline{C2}}$, $\overline{\overline{C2}}$. Costs can represent a distortion introduced by the channel on the respective signal: for the speech this will be a perceptual distortion, as is the case of $\overline{\overline{C1}}$, while for control signals it will be a probability that the signal could not be interpreted correctly.

The two matrices are addressed by rows by I3, while columns will be addressed by an index k, supplied by E1 through connection 43, which is generated during the cost minimization algorithm and which can vary from I3 to 1. The data read are supplied to E1 through connections 23, 24.

Figure 3:
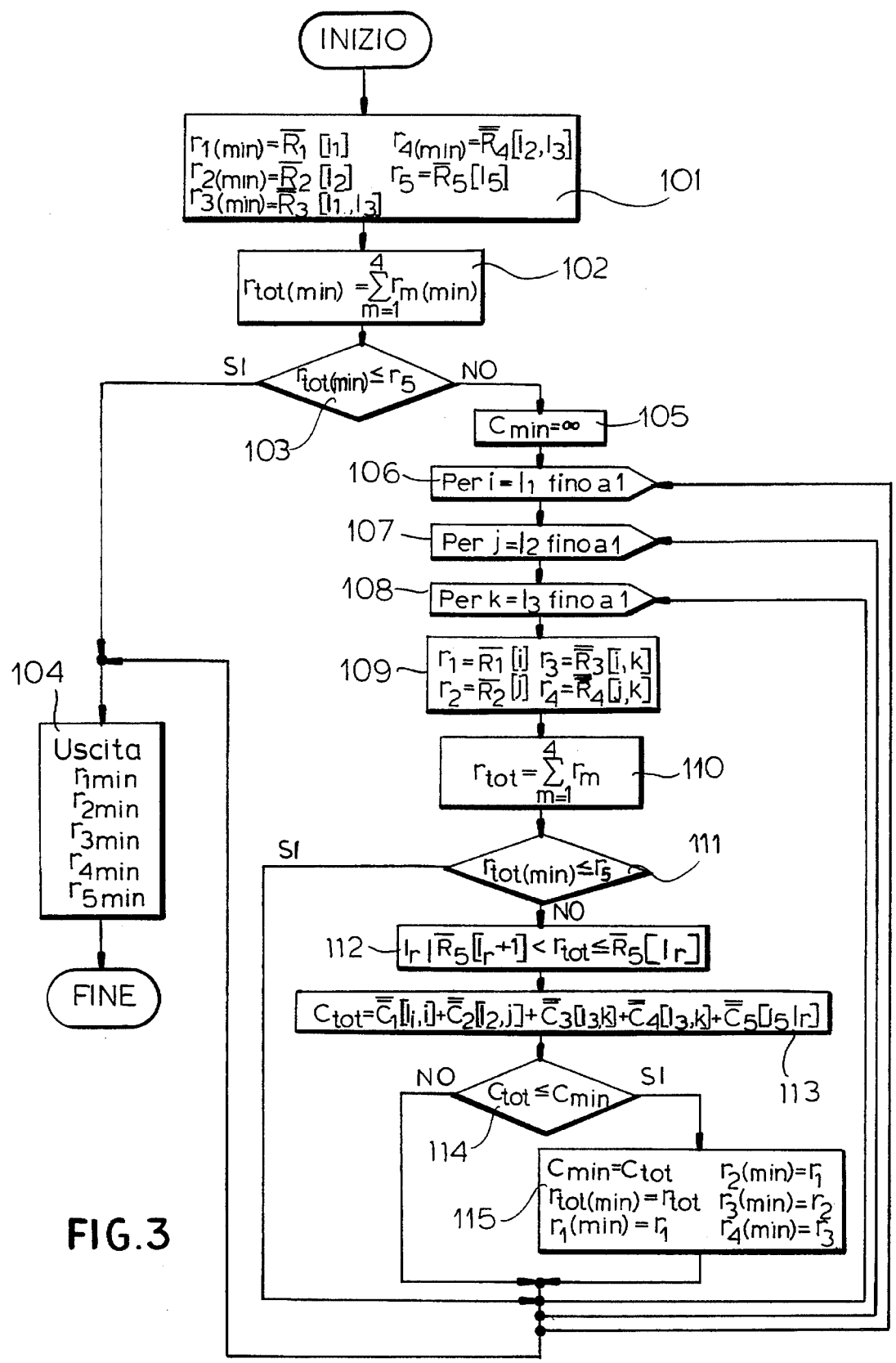
FIG. 3 is a flow chart of the operations of the unit of FIG. 2.

FIG. 3 contains the flow chart of the algorithm. At each frame, the rate vector/matrix components addressed by indices I1 . . . I5 and the values of the indices are loaded in EL (step 101). Said components are indicated as $r_m$(min) where m=1,2,3,4. The corresponding total rate $$r_{tot}(\min) = \sum_{m=1}^{4} r_m(\min)$$

is then determined and compared with rate $r_s$ permitted by the system (steps 102, 103). If $r_{tot}$(min) does not exceed $r_s$, the four rates requested are accepted and the relevant commands are emitted for blocks CV1, CS1, CC1, CC2, MX1 (CV2 . . . MX2) (step 104).

If the total rate required exceeds system rate $r_s$, it is necessary to pass on to cost evaluation. Total cost of the request is initialized to a value Cmin=∞ (step 105) and every possible rate combination, equal to or lower than those indicated by indices I1–I4, is tested (steps 106–109). The combinations different from the initial one are obtained by diminishing the individual indices by 1 unit, independently from one another. Indices i, j, k represent the values assigned to I1, I2, I3 at a given step of the test. For each combination of i, j, k, the total rate is calculated again (step 110) and is compared now with the maximum rate admissible on the channel (step 111). If the total rate is higher than maximum rate, the only possibility is to try a combination of lower values, otherwise the cost of the combination under test will be assessed. Comparison with maximum rate and not with system rate r5 means that the possibility is also envisaged of allocating the communication a total rate which is higher than the system rate, by paying the respective price, represented by cost $c_5$(I5,Ir).

For cost assessment, it is necessary to determine index Ir (step 112) and to calculate total cost Ctot, as the sum of the costs addressed in the individual matrices $\overline{\overline{C1}}$. . . $\overline{\overline{C5}}$ (step 113). This cost is compared with value Cmin (∞ if the initial combination is being assessed) (step 114) and whenever a total cost is lower than the one stored in memory this value is updated. Also the corresponding values $r_1 \ldots r_4$, $r_{tot}$ are stored. At the end of the test on all the combinations of indices i, j, k, unit EL will supply values $r_1 \ldots r_4$, $r_{tot}$ determined.

It is clear that trying all possible combinations of values of i, j, k can be effected so long as indices I1 . . . I5 have a limited number of values, as in the example given. Under these conditions, control unit UC2 could also simultaneously manage several communications. If the number of combinations is too high, dynamic programming techniques, tree selection techniques and so on, o can be used, which allow discarding beforehand a number of combinations.

It is clear that what described has been given only by way of non limiting example, and that variations and modifications are possible without going out of the scope of the invention.

For example, even if matrices $\overline{\overline{C1}}$. . . $\overline{\overline{C5}}$ have been assumed to be constant for all frames, it is possible to update the values periodically. As an alternative to storage as matrices, the costs related to source and channel conditions could be organized into vectors, corresponding to the first column of the respective matrices; these vectors would vary on a frame by frame basis. Moreover, the cost vector relative to the second input would also be a function of the choice made in the preceding frames, since each choice influences the probability that the procedure can be brought to successful conclusion within the time set.

Furthermore, the invention can be applied for services other than speech transmission, such as variable-rate data transmission, in which the two streams would be represented by the data and by the signalling, or in systems employing access techniques different from CDMA but always in connection with variable-rate transmissions, e.g. PRMA (Packet Reservation Multiple Access) or ATM (Asynchronous Transfer Mode) techniques. Moreover, even if the invention has been disclosed in connection with a mobile communication system, it can be also applied to other radio communication systems comprising at least two stations connected via radio channels, in particular satellite communication systems.

We claim:

1. A method of controlling transmission, on a common radio channel, of variable-rate information streams relative to a given communication and originated from different sources, comprising the steps of:

(a) emitting each of said streams from a respective source at a rate ($r_1$, $r_2$) which, in a given time interval, is chosen within respective set of source rates;

(b) associating the streams before transmission on the channel with a redundancy which is chosen within a set of possible redundancy schemes and which determines an increment ($r_3$, $r_4$) in the stream rate;

(c) during the said interval assessing source needs in terms of an emission rate which is best suited to stream characteristics, channel needs in terms of redundancy to be associated with the respective streams an system needs in terms of channel rate; and (d) allocating to each stream an emission rate and redundancy which guarantee a predetermined quality of the particular communication and of the service offered by the system, each stream being allocated an emission rate and redundancy which meet the respective needs if a total rate ($r_{tot}$) resulting from the combination of the streams on the channel, expressed as a sum stream emission rates and the rate increments due to redundancies, does not exceed a rate ($r_5$) imposed by the system conditions, and otherwise each stream is allocated such an emission rate and such a redundancy as to minimize a cost of the communication and given by the sum of the costs resulting from individual needs.

2. The method according to claim 1 wherein the radio channel is a communication channel between a mobile station and a base station of a mobile communication system, and the assessment of said needs is performed separately in the mobile station and in the base station, respectively for a direction from the mobile station towards the base station and for a direction from the base station towards the mobile station.

3. A method of controlling transmission, on a common radio channel, of variable-rate information streams relative to a given communication and originated from different sources, comprising the steps of:

(a) emitting each of said streams from a respective source at a rate ($r_1$, $r_2$) which, in a given time interval, is chosen within respective set of source rates;

(b) associating the streams before transmission on the channel with a redundancy which is chosen within a set of possible redundancy schemes and which determines an increment ($r_3$, $r_4$) in the stream rate;

(c) during the said interval assessing source needs in terms of an emission rate which is best suited to stream characteristics, channel needs in terms of redundancy to be associated with the respective streams and system needs in terms of channel rate; and (d) allocating to each stream an emission rate and redundancy which guarantee a predetermined quality of the particular communication and of the service offered by the system, and wherein the information on said needs are represented by indices (11 ... 15), linked to one of the possible source rates of each stream, to one of the possible redundancy schemes and to one of the possible channel rates.

4. The method according to claim 3 wherein said indices constitute reading addresses for accessing stored information on the emission and channel transmission rates and on the rate increments caused by the redundancies, as well as on the costs associated with the rates and redundancies actually allocable.

5. The method according to claim 4 wherein the information on the channel needs is represented by a single index for all information streams.

6. The method according to claim 4 wherein the stored information relative to the source rates and to the channel rates consists of vectors with as many components as there are possible rate values, and the information on the rate increments caused by the redundancies is represented by matrices in which each component is associated with a combination of source/redundancy rates.

7. The method according to claim 4 wherein the stored information relative to costs is in the form of digital values, normalized with respect to a common base and organized into matrices in which each component is associated with a combination of rates/redundancies required and rates/redundancies allocable.

8. The method according to claim 7 wherein said cost matrices are constant matrices.

9. The method according to claim 4 wherein the information stored relative to costs related to the source and channel needs is in the form of digital values organized into vectors, updated at every time interval.

10. The method according to claim 1 wherein the information streams are digitally coded speech signals and control signals of a speech communication.

11. The method according to claim 1 wherein the information streams are data and control signals of a variable-rate data transmission.

12. The method according to claim 2 wherein the mobile communication system is a system in which channel access occurs according to code division techniques and the transmission period on the channel is divided into frames, and in that the determination of the rate and of the redundancy to be allocated to the individual streams is made at each frame.

13. The method according to claim 2 wherein the communication system is a system in which channel access for variable-rate transmissions occurs according to time division technique.

14. A communication system including at least two stations (M1 ... Mh; RNC; B1 ... Bn) connected via a radio channel and including:

sources (CV1, CS1; CV2, CS2) of variable-rate information streams relative to a common communication that must be combined on said radio channel 16), each source being able to operate, in a given time interval, with a rate ($r_1$, $r_2$) chosen within a respective set of rates;

means (CC1, CC2; CC3, CC4) to introduce into each stream, in said time interval, a redundancy chosen from a set of possible redundancy schemes, each of which causes an increment ($r_3$, $r_4$) in the rate of the stream emitted by the source;

means (MX1, MX2) for combining the individual streams into a single stream to be transmitted on the channel (6);

management units (MM, BM, RNCM for the stations;

a variable-rate stream control unit (UC1, UC2) for each station which, for each communication receives from the sources (CV1, CS1; CV2, CC2) information on source needs in terms of the emission rate which is best suited to the characteristics of the respective information stream in that interval, receives from the management units (MM, RNCM) information on the needs of the channel (6) and the entire system in that interval, expressed in terms of redundancy and respectively of transmission rate on the channel, determines a particular source rate and a particular redundancy for each flow, and provides the sources CV1, CS1; CV2, CS2) and the means (CC1, CC2; CC3, CC4) for redundancy introduction with commands for the choice of that particular source rate and redundancy, the rates and redundancies chosen being those which guarantee the attainment of a predetermined quality of the particular communication and of the service offered by the system, the rates and redundancies chosen being those which satisfy the source and channel needs in that interval, if the total rate ($r_{tot}$) of the stream resulting from the combination, expressed as the sum of the emission rates of the streams and the rate increments caused by the redundancies, does not exceed a rate ($r_5$) determined by the system conditions, while otherwise the rates and redundancies are chosen so as to minimize a total cost of the communication and given by the sum of the costs resulting from the individual needs.

15. A communication system including at least two stations M1 ... Mh; RNC; B1 ... Bn) connected via a radio channel and including:

sources (CV1, CS1; CV2, CS2) of variable-rate information streams relative to a common communication that must be combined on said radio channel (6), each source being able to operate, in a given time interval, with a rate ($r_1$, $r_2$) chosen within a respective set of rates;

means (CC1, CC2; CC3, CC4) to introduce into each stream, in said time interval, a redundancy chosen from a set of possible redundancy schemes, each of which causes an increment ($r_3$, $r_4$) in the rate of the stream emitted by the source;

means (MX1, MX2) for combining the individual streams into a single stream to be transmitted on the channel (6);

management units (MM, BM, RNCM for the stations;

a variable-rate stream control unit (UC1, UC2) for each station which, for each communication receives from the sources (CV1, CS1; CV2, CC2) information on source needs in terms of the emission rate which is best suited to the characteristics of the respective information stream in that interval, receives from the management units (MM, RNCM) information on the needs of the channel (6) and the entire system in that interval, expressed in terms of redundancy and respectively of transmission rate on the channel, determines a particular source rate and a particular redundancy for each flow, and provides the sources (CV1, CS1; CV2, CS2) and the means (CC1, CC2; CC3, CC4) for redundancy introduction with commands for the choice of that particular source rate and redundancy, the rates and redundancies chosen being those which guarantee the attainment of a predetermined quality of the particular communication and of the service offered by the system, each control unit (UC1; UC2) including a first group of memories (ME1-1 ... ME1-5), which store information relative to the possible rates of the streams emitted by the sources, to the combinations of each of these rates with each of the redundancies foreseen for the respective stream, and to the possible rates on the channel, and which are addressed respectively by the information on the needs of the sources (CV1, CS1; CV2, CS2), of the channel (6) and of the system supplied by the sources (CV1, CS1; CV1, CS2) and the management units (MM, RNCM), respectively;

a second group of memories (ME2-1 ... ME2-5), which store information on the costs associated with the possible choices of rates of the streams flowing from the sources, of the redundancy required by the channel conditions and of the rate on the channel (6), and are addressed in reading at least by the information provided by the sources (CV1, CS1; CV2, CS2) and by the management units (MM, RNCM);

a processing unit (EL), which receives from the sources (CV1, CS1; CV2, CS2) and from the management units (MM, RNCM) information on the source, channel and system needs, and from the first and second group of memories (ME1-1 ... ME1-5, ME2-1 ... ME2-5) information on the rates, redundancies and costs, and provides the sources (CV1, CS1; CV2, CS2) and the means (CC1 ... CC4) of redundancy introduction with commands for the choice of the emission rate and of the redundancy.

16. The communication system according to claim 15 wherein the sources (CV1, CS1; CV2, CS2) and the management units (MM, RNCM) provide the information on the source, channel and system needs in the form of indices (I1 ... I5) which constitute reading addresses or parts of the reading addresses in said memories (ME1-1 ... ME2-5).

17. The communication system according to claim 15 wherein the first group of memories (ME1-1 ... ME1-5), the memories (ME1-1, ME1-2, ME1-5) for the information on the source and channel needs store rate values organized into vectors, each having as many components as there are possible values for the source and channel rates, and the memories (ME1-3, ME1-4) for information on the channel needs store rate values organized into matrices in which each row is associated with one of the rate values of the respective source, and each column with one of the possible increments caused by the redundancy.

18. The communication system according to claim 15 wherein the memories of the second group (ME2-1 ... ME2-5) store numerical cost values organized into matrices, and each memory location is addressed jointly by one of the said indices (I1 ... I5) and by a further index, generated by said processing unit (EL) during the determination of the rates and of the redundancies and associated with a rate or a redundancy that can be actually allocated to the individual streams emitted by the source or respectively to the total rate of the stream resulting from the combination.

19. The communication system according to claim 18 wherein said cost matrices are constant matrices.

20. The communication system according to claim 15 wherein the memories of the second group (ME2-1 ... ME2-4) storing costs related to the source and channel needs store numerical values organized into vectors, updated at each time interval.

21. The communication system according to claim 15 wherein the information streams are speech signals coded in digital form and control signals of a speech communication.

22. The communication system according to claim 15 wherein the information streams are data and control signals of a variable-rate data transmission.

23. The communication system according to claim 15 wherein the communication system is a mobile communication system comprising a plurality of mobile stations (M1 ... Mh) and a fixed part (RNC; B1 ... Bn), consisting of base stations (B1 ... Bn) and of radio network control units (RNC), and the unit (UC1, UC2) controlling the variable rate streams is provided in each mobile station (M1 ... Mh) and in the fixed part (RNC; B1 ... Bn).

24. The communication system according to claim 23 wherein the mobile communication system is a system in which channel access occurs through code division techniques.

25. The communication system according to claim 23 wherein the mobile communication system is a system in which channel access for a variable-rate transmission occurs through time division techniques.

* * * * *